Figure 1:
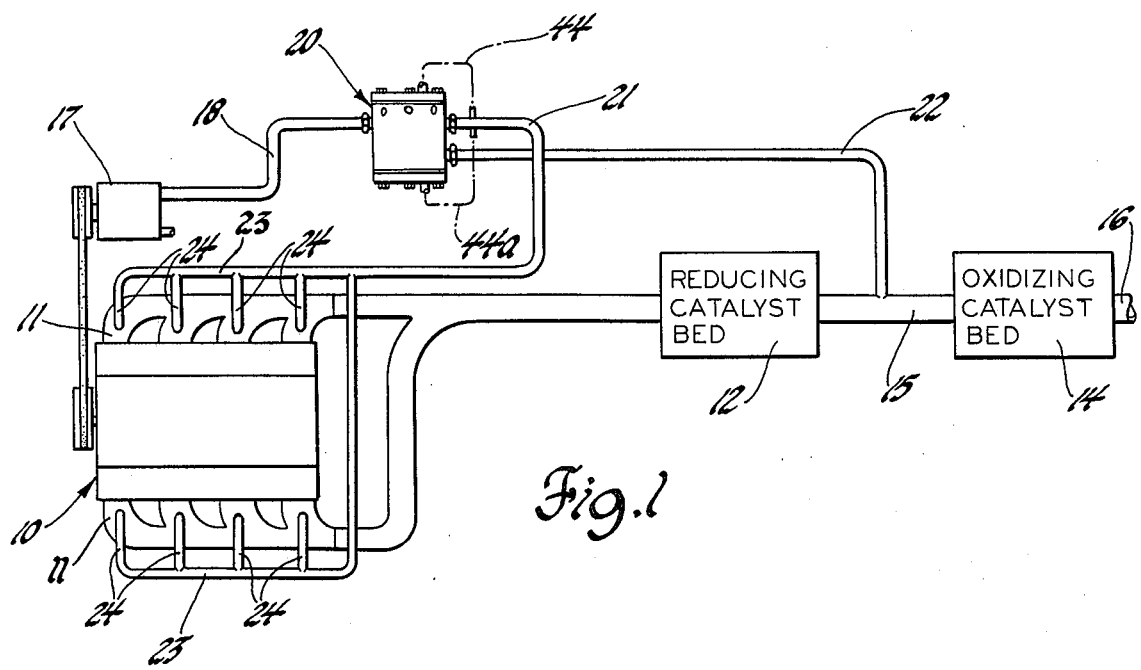

United States Patent [19]

Haka

[11] 4,081,960
[45] Apr. 4, 1978

[54] AIR FLOW CONTROL VALVE
[75] Inventor: Raymond J. Haka, Rochester, Mich.
[73] Assignee: General Motors Corporation, Detroit, Mich.
[21] Appl. No.: 768,737
[22] Filed: Feb. 15, 1977
[51] Int. Cl.² .............................................. F01N 3/15
[52] U.S. Cl. ..................................... 60/289; 60/301; 60/306
[58] Field of Search .................... 60/289, 301, 306

[56] References Cited
U.S. PATENT DOCUMENTS

| 3,791,146 | 2/1974 | Hayashi | 60/289 |
| 3,919,842 | 11/1975 | Bolton | 60/289 |
| 3,927,524 | 12/1975 | Cholvin | 60/289 |

Primary Examiner—Douglas Hart
Attorney, Agent, or Firm—Arthur N. Krein

[57] ABSTRACT

A control valve for the exhaust emission control system of the engine for an automotive vehicle controls secondary air flow between a region ahead of a reducing converter and a region intermediate the reducing converter and an oxidizing converter of the system, the amount of air introduced being proportional to engine exhaust flow. The air flow control valve, adapted to be connected to a source of secondary air, includes a first fixed area orifice to control air flow to the region ahead of the reducing converter, a second fixed area orifice and a first diaphragm controlled variable area orifice to control air flow to the region intermediate the reducing converter and the oxidizing converter, a second diaphragm controlled variable area orifice being used to control bypass air flow to the atmosphere.

3 Claims, 2 Drawing Figures

Fig. 2

U.S. Patent  April 4, 1978  4,081,960

AIR FLOW CONTROL VALVE

This invention relates to the control of secondary air flow to the exhaust purification or emission control system for the engine of a vehicle and, in particular, to a dual outlet proportional air flow control valve for use in such a system.

Exhaust emission control systems, in use for the purification of vehicle exhaust gases, provide for the passage of the exhaust fumes through a catalytic converter comprising materials whose exposure to the noxious exhaust elements will catalytically react the elements thereby converting them into an innocuous form whose presence in the atmosphere is not objectionable. The catalytic converter may be a dual bed type converter having one bed which will effect conversion of the carbon monoxide and hydrocarbons and the other bed for the reduction of the oxides of nitrogen. In such dual bed converter systems, the beds may be arranged in separate canisters or in a single canister and may be arranged to have the exhaust gases passed serially therethrough with secondary air being introduced between the two beds, that is, ahead of the second bed or oxidizing converter thereby creating therein an oxidizing atmosphere for conversion of carbon monoxide hydrocarbons. Lack of excess oxygen in the first bed or reducing converter will create a reducing atmosphere therein for reaction of the nitric oxides.

However, some reducing catalysts require an atmosphere containing some oxygen. This can be accomplished by introducing a small amount of secondary air ahead of the reducing converter. If too much air is used, the reducing converter will, in effect, see an oxidizing atmosphere. If too little air is used, too much ammonia will be formed by the reducing catalysts. Both of these conditions will result in loss of reducing converter efficiency. Various systems, with one or more valves incorporated therein, have been proposed to control the flow of secondary air to a region ahead of the reducing converter and to control the flow of air to the oxidizing converter, the control of these air flows being effected by one or more of these valves which are responsive to engine or exhaust temperatures and possibly engine vacuum.

It is now known that the amount of secondary air introduced to a region of the system ahead of the reducing converter should be proportional to engine flow which, of course, is directly related to the flow of exhaust gases discharged from the engine to the reducing converter. A valve for such proportional control of secondary air flow has been disclosed in U.S. Pat. No. 3,919,842 entitled "Controller for Proportional Control of Reducing Converter Air" issued Nov. 18, 1975 to Robert A. Bolton.

It is therefore the primary object of this invention to improve an air control valve for use in an exhaust emission control system whereby the air control valve is adapted to provide proportional secondary air flow to more than one region in the exhaust emission control system.

Another object of this invention is to improve an air control valve for controlling the flow of secondary air to the exhaust emission control system of an internal combustion engine whereby the air control valve is operative so that the flow of secondary air introduced into the system upstream of the reducing converter and the flow of secondary air introduced into the system intermediate the reducing converter and the oxidizing converter of the system is proportional to the exhaust flow discharged from the engine.

Figure 2:
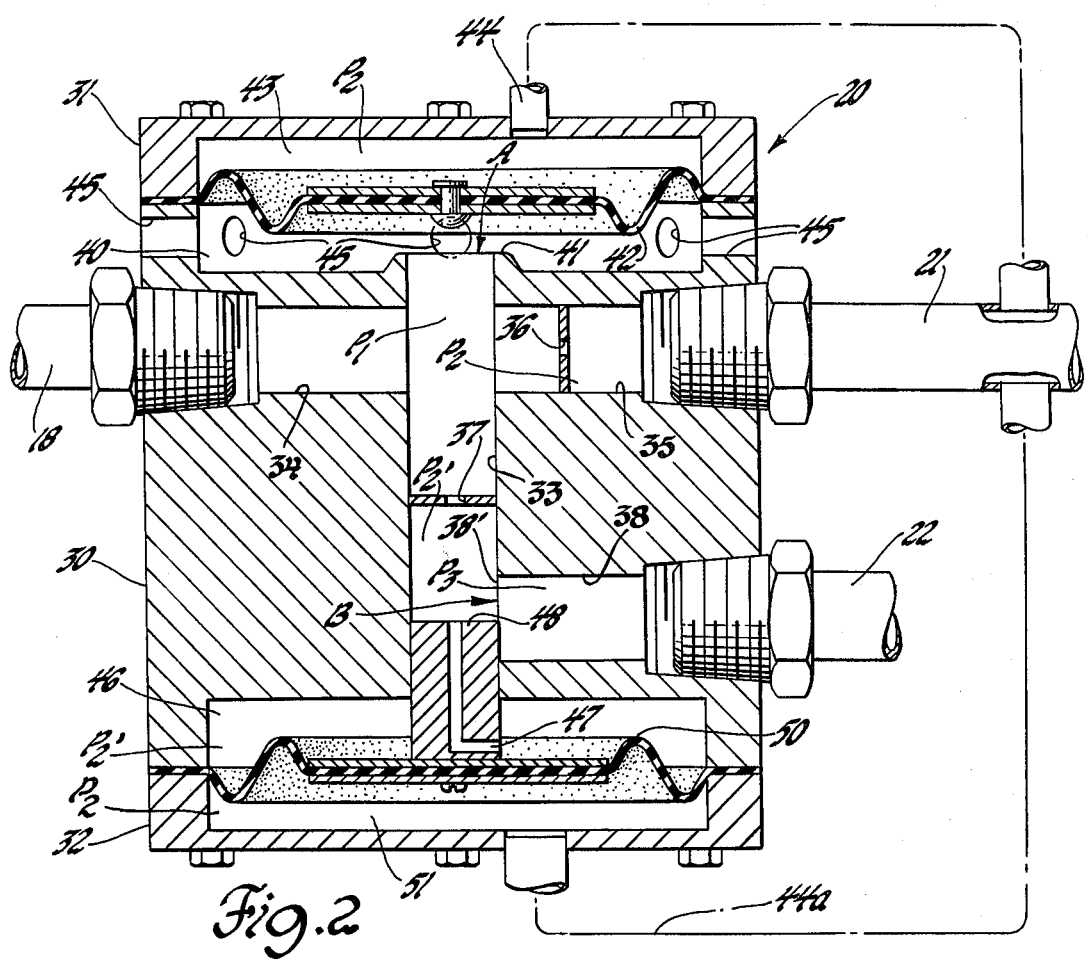

For a better understanding of the invention, as well as other objects and further features thereof, reference is had to the following detailed description of the invention to be read in connection with the accompanying drawings, wherein:

FIG. 1 is a schematic illustration of an internal combustion engine having a dual bed catalytic converter exhaust emission control system with the flow of secondary air thereto being controlled by an air control valve in accordance with the invention; and, FIG. 2 is a schematic, sectional view of the air control valve of FIG. 1.

Referring first to FIG. 1, there is schematically illustrated an internal combustion engine 10 for an automotive vehicle, not shown, having an exhaust emission control system including exhaust manifolds 11 receiving the exhaust gases discharged from the engine. The exhaust manifolds 11 are interconnected for discharge of exhaust gases through a dual bed catalytic converter including a reducing converter 12, having a reducing catalyst bed therein, and an oxidizing converter 14, having an oxidizing catalyst bed therein, these two converters being shown as enclosed by separate canisters and interconnected by a connector exhaust duct 15. The outlet side of the oxidizing converter 14 is connected to a conventional exhaust tailpipe 16.

An air pump 17, which may be engine driven in a conventional manner, as shown, is used to deliver secondary air through a conduit 18 to an air control valve, generally designated 20, constructed in accordance with the invention, which valve 20 operates, in a manner to be described, to deliver secondary air via a conduit 21 to a region ahead of the reducing converter 12 and via a conduit 22 to a region intermediate the reducing converter 12 and the oxidizing converter 14, as by having conduit 22 operatively connected to exhaust duct 15.

Although the secondary air delivered through conduit 21 can be introduced into the exhaust stream any place ahead of the reducing converter 12, it is preferably introduced, as shown, closely adjacent to the exhaust ports, not shown, of the engine 10. For this purpose, each of the exhaust manifolds 11 has an air injection unit in the form of an air manifold 23 positioned adjacent to it. Each of the air manifolds 23 is provided with a series of injection tubes 24 extending into the exhaust manifold 11 with which it is associated, with these tubes terminating at a position downstream of and closely adjacent to the exhaust valves of the engine cylinders, not shown. With this arrangement, secondary air is delivered through these injection tubes into the stream of exhaust gases or combustibles flow paths closely adjacent to the exhaust valves of the engine.

Referring now to the subject matter of the invention, the air control valve 20, as shown in FIG. 2, includes a multi-piece valve housing including a valve body 30 with upper and lower cover members 31 and 32, respectively, suitably fixed thereto. Valve body 30 is provided with a central cylindrical through bore passage 33 and with an air inlet 34 intersecting this bore passage 33 closely adjacent to one end thereof, the air inlet being adapted for connection by conduit 18 to the air pump 17 and, with a primary outlet 35, having a fixed primary flow control orifice 36, of predetermined size, therein which intersects the bore passage 33 closely adjacent to the one end thereof intersected by the inlet 34. At its opposite end, the primary outlet 35 is adapted to be connected by the conduit 21 for delivering secondary air to a region upstream of the reducing converter 12, in the manner previously described.

Intermediate its ends, the bore passage 33, in valve body 30, is provided with a fixed secondary flow control orifice 37 of predetermined size and a secondary outlet 38 is provided in valve body 30, with one end 38' of this secondary outlet intersecting the bore passage 33 on the downstream side of the control orifice 37, that is, the side of this orifice 37 which is opposite to that intersected by the inlet 34. The opposite end of the secondary outlet 38 is adapted to be connected to the conduit 22 for delivering secondary air flow to the exhaust system intermediate the reducing converter 12 and the oxidizing converter 14.

The valve body 30 at its inlet end, that is, the end having the inlet 34 adjacent thereto, which is the upper end as shown in FIG. 2, is recessed to provide a first compartment 40 having an upstanding valve seat 41 therein with the inlet end of the bore passage 33, with reference to inlet 34, extending through this valve seat for communication with the compartment 40. As shown, a flexible diaphragm 42 is secured between the upper end of the valve body 30 and the upper cover member 31 for defining a first pressure chamber 43 that is placed in communication with the engine exhaust system upstream of the reducing converter 12, for example, as by being connected via a conduit 44 to the conduit 21 whereby this chamber 43 is subjected, during engine operation, to the exhaust system pressure $P_2$. A predetermined plurality of bypass outlets 45 are provided in the upper rim of the valve body 30 surrounding the compartment 40 whereby the portion of this compartment 40 radially outward of the valve seat 41 is in adequate flow communication with the atmosphere so that this area of the diaphragm is subjected to atmospheric pressure, that is, zero gage pressure. With the construction shown, it will be apparent that, since the flexible diaphragm 42 will be movable realtive to the valve seat 41 surrounding the upper outlet end of the bore passage 33, it will form with these elements a variable bypass orifice, generally designated A, for controlling the flow of secondary air from the bore passage 33 into the compartment 40, this air flow being the bypass air flow with the bypass secondary air being discharged to the atmosphere via outlets 45.

The valve body 30 at its opposite end, the lower end as seen in FIG. 2, is also recessed to provide a second compartment 46 in communication with the opposite or lower end of the bore passage 33 via a suitable through passage 47 extending through a post or plunger 48 slidably journaled in this one end of the bore passage 33. A flexible diaphragm 50 is secured between the lower end of the valve body 30 and the lower cover member 32 for defining a second pressure chamber 51 with the lower cover and for separating this chamber 51 from the compartment 46. The chamber 51, like the chamber 43, is placed in communication with the engine exhaust system upstream of the reducing converter, as, for example, by being connected by a conduit 44a to the conduit 21 whereby this second pressure chamber 51 is subjected to exhaust system pressure $P_2$.

As shown, the plunger 48 is suitably fixed at one end to the diaphragm 50 for movement therewith and, the axial extent of this plunger 48 is preselected so that, upon axial movement thereof in the bore passage 33, it will control the flow area opening through the one end 38' of the secondary outlet 38 whereby to provide, in effect, a variable area orifice, designated B, downstream, in terms of the secondary air flow path, of the fixed flow control orifice 37.

In the as assembled condition, the diaphragms 42 and 50 would each normally assume its normal or null position as shown, that is, the central portion of each of these diaphragms would lie in substantially the same plane as the outer peripheral edge thereof, as sandwiched between the valve body and its associated cover member. This would also be the normal position of these elements when the engine 10 is not in operation.

During engine operation, secondary air is supplied by the pump 17 to the inlet 34 at a suitable pressure $P_1$ which pressure is above atomspheric pressure and the exhaust system pressure $P_2$. The air control valve 20 maintains proportional secondary air flow by means of the variable orifice A which changes the bypass flow restriction by the proximity of diaphragm 42 relative to valve seat 41. The diaphragm 42 will move, to regulate secondary air bypass flow, until the sum of the forces acting upon it equal zero, that is, $$\sum_{\text{Top}} \text{pressure} \times \text{area} = \sum_{\text{Bottom}} \text{pressure} \times \text{area, or} \quad 1$$

$$P_2(A_1 + A_2) = P_1 A_1 + P_{ATMOS} A_2 \quad 2$$

where:
- $A_1$ = Diaphragm 42 area inside variable orifice A
- $A_2$ = Diaphragm 42 area surrounding variable orifice A
- $P_1$ = Air Supply Pressure (Gage)
- $P_2$ = Exhaust System Pressure (secondary flow of highest back pressure) (Gage)

$P_{ATMOS}$ = Atmospheric pressure, that is, zero gage pressure, therefore $$P_1 - P_2 = \frac{A_2}{A_1} P_2 \quad 3$$

Since the exhaust system flow is proportional to the pressure at a given pressure point ($P_2$) therefore:

Engine Flow = $K_E P_2$ where:
$K_E$ = Engine constant

The secondary air flow to the region upstream of the reducing converter 12 is proportional to the pressure difference across the fixed orifice 36, therefore:

Secondary air flow = $K_A (P_1 - P_2)$ where:

$K_A$ = Orifice flow constant substituting equations 4 & 5 into equation 3 yields equation $$\text{Secondary air flow} = \frac{A_2}{A_1} \frac{K_A}{K_E} \text{engine flow} \quad 6$$

Equation 6 verifies that the flow through orifice 36 is proportional to engine flow.

A second proportional flow path to the region intermediate the reducing converter 12 and the oxidizing converter 14 is made available by diaphragm 50 which maintains the orifice 37 downstream pressure equal to the orifice 36 downsteam pressure ($P_2 = P_2'$). This is accomplished by the restriction of variable orifice B which raises $P_3$ to $P_2'$ by movement of diaphragm 50 as a function of pressure $P_2'$. Setting $P_2' = P_2$ causes the orifice 37 pressure drop to equal $P_1 = P_2$ which will maintain proportionality, as previously described above. It will be apparent that it is necessary to have orifice 36 direct flow to the highest back pressure flow point in the exhaust system because variable orifice B can only raise the fixed orifice 37 downstream pressure to this same pressure value only.

By applying system exhaust pressure $P_2$ to one side of each of the diaphragms 42 and 50, the air control valve 20 is self-regulating so as to vary the area of each of the variable area orifices A and B as a function of engine exhaust back pressure, the orifice A controlling the bypass flow of secondary air to the atmosphere and the orifice B controlling the pressure on the downstream side of the fixed orifice 37 to that seen by fixed orifice 36 so that secondary air flow through each of these orifices is proportional to engine flow.

What is claimed is:

1. An air flow control valve for use in the exhaust emission control system of an internal combustion engine wherein the system includes conduit means connected to the engine for receiving exhaust gases discharged from the exhaust ports of the engine and for delivering the exhaust gases serially through a reducing converter and an oxidizing converter and an air supply means for providing secondary air to said conduit means, said air flow control valve including a housing means having a first chamber with a boss upstanding centrally therein and a second chamber in spaced apart relation therein, a passage means in said housing means having one end opening through said boss into said first chamber and its opposite end opening into said second chamber, said housing further having an inlet connected to said air supply means and being in communication with said passage means adjacent to said one end, a first outlet in communication with said passage means adjacent to said one end and connectable to said conduit means upstream of said reducing converter, a second outlet in communication with said passage means adjacent to said other end and connectable to said conduit means intermediate said reducing converter and said oxidizing converter, a first fixed orifice in said first outlet, a second fixed orifice in said passage means intermediate the intersection of said first outlet and of said second outlet with said passage means, a first diaphragm positioned in said first chamber to divide said first chamber into a first pressure chamber on the side of said first diaphragm adjacent said port and a second pressure chamber on the opposite side of said first diaphragm, said first diaphragm being movable relative to said boss to define with said passage means a variable orifice opening into said first pressure chamber, said housing means further having bypass port means in communication with said first pressure chamber, a second diaphragm positioned in said second chamber to divide said second chamber into a third pressure chamber on the one side of said second diaphragm next adjacent to said passage means and a fourth pressure chamber on the opposite side of said diaphragm, an apertured plunger means fixed to said one side of said second diaphragm, said apertured plunger means being slidably positioned in said opposite end of said passage means and extending an axial length into said passage means so that upon movement of said second diaphragm, said apertured plunger means is operable to variably control the flow from said passage means into said second outlet, said apertured plunger means having aperture means therein opening at one end into said passage means downstream of said second fixed orifice and opening at its opposite end into said third pressure chamber and, first conduit means and second conduit means operatively connecting said second pressure chamber and said fourth pressure chamber, respectively, to said first outlet on the side of said first fixed orifice therein opposite said inlet.

2. An air flow control valve for use in the exhaust emission control system of an internal combustion engine wherein the system includes conduit means connected to the engine for receiving exhaust gases discharged from the exhaust ports of the engine and for delivering the exhaust gases serially through a reducing converter and an oxidizing converter and an air supply means for providing secondary air to said conduit means, said air flow control valve including housing means having a longitudinal extending bore passage therein with one end of said bore passage opening through a valve seat in said housing means to be in communication with the atomsphere, an inlet opening into said bore passage closely adjacent said one end, a first outlet, including a fixed orifice, extending to said bore passage closely adjacent said one end and being adapted to be connected to said conduit means upstream of said reducing converter, a second outlet in communication with said bore passage adjacent to the opposite end of said bore passage and adapted to be connected to said conduit means intermediate said reducing converter and said oxidizing converter, a second fixed orifice positioned in said bore passage intermediate said inlet and said second outlet, differential pressure actuated valve means in said housing means positioned to be movable relative to said valve seat at one end of said bore passage for controlling bypass flow from said bore passage to the atmosphere, said differential pressure actuated valve means including a pressure chamber operatively connectable to said conduit means between the engine and the reducing converter and, exhaust pressure actuated variable orifice means movable relative to said second outlet for controlling pressure on the side of said second orifice in said bore passage adjacent said second outlet.

3. An air flow control valve for use in the exhaust emission control system of an internal combustion engine wherein the system includes conduit means connected to the engine for receiving exhaust gases discharged from the exhaust ports of the engine and for delivering the exhaust gases serially through a reducing converter and an oxidizing converter and an air supply means for providing secondary air to said conduit means, said air flow control valve including a valve body having at one end a first compartment with a boss upstanding centrally therein and at its opposite end a second compartment, a passage means in said valve body having one end opening through said boss into said first compartment and its opposite end opening into said second compartment, said valve body further having an inlet connected to said air supply means and being in communication with said passage means adjacent to said one end, a first outlet, including a first fixed orifice, in communication at one end with said passage means adjacent to said one end and at its other end being connectable to said conduit means upstream of said reducing converter, a second outlet in communication at one end with said passage means adjacent to said other end and being connectable at its other end to said conduit means intermediate said reducing converter and said oxidizing converter, a second fixed orifice in said passage means intermediate the intersection of said first outlet and of said second outlet with said passage means, a first cover member, a first diaphragm secured between said one end of said valve body and said first cover member for defining a first chamber with said first cover member and for separating said first compartment from said first chamber, said first diaphragm being movable relative to said boss to define with said passage means a variable orifice opening into said first compartment, said valve body further having bypass port means in communication with said first compartment, a second cover member, a second diaphragm secured between said second cover member and the opposite end of said valve body for defining a second chamber with said second cover member and for separating said second compartment from said second chamber, an apertured plunger means fixed to one side of said second diaphragm and slidably positioned in said opposite end of said passage means, said aperture plunger means extending an axial length into said passage means so that upon movement of said second diaphragm, said apertured plunger means is operable to variably control the flow from said passage means into said second outlet, said apertured plunger means having aperture means therein opening at one end into said passage means downstream of said second fixed orifice relative to said inlet and opening at its opposite end into said second compartment and, first conduit means and second conduit means operatively connecting said first chamber and said second chamber, respectively, to said first outlet downstream side of said first fixed orifice relative to the flow path of secondary air through said inlet.

* * * * *

UNITED STATES PATENT AND TRADEMARK OFFICE
CERTIFICATE OF CORRECTION

PATENT NO. : 4,081,960
DATED : April 4, 1978
INVENTOR(S) : Raymond J. Haka

It is certified that error appears in the above-identified patent and that said Letters Patent are hereby corrected as shown below:

Column 4, lines 61 and 62, after "3 yields equation" insert -- 6 --.

Column 8, line 6, "aperture" should read -- apertured

Signed and Sealed this

Fifteenth Day of August 1978

[SEAL]

Attest:

RUTH C. MASON
Attesting Officer

DONALD W. BANNER
Commissioner of Patents and Trademarks